United States Patent [19]

Malinowski

[11] Patent Number: 4,814,081
[45] Date of Patent: Mar. 21, 1989

[54] HONEYCOMBED FILTER SUPPORT DISC

[76] Inventor: Raymond J. Malinowski, 1130 Shoreland, Niles, Mich. 49120

[21] Appl. No.: 145,300

[22] Filed: Jan. 19, 1988

[51] Int. Cl.⁴ .............................................. B01D 35/02
[52] U.S. Cl. .................................... 210/489; 210/496; 210/497.2; 210/510.1; 425/197; 428/116; 428/593; 55/529; 137/550; 493/966
[58] Field of Search ................ 493/966; 428/116, 118, 428/593; 55/529; 137/550; 210/488, 489, 494.1, 496, 497.2, 503, 506, 510.1; 425/197; 75/0.5 AB, 0.5 BB, 93 R

[56] References Cited

U.S. PATENT DOCUMENTS

| | | | |
|---|---|---|---|
| 4,420,316 | 12/1983 | Frost et al. | 210/510.1 |
| 4,464,185 | 8/1984 | Tomita et al. | 210/510.1 |
| 4,591,383 | 5/1986 | McGarry et al. | 210/510.1 |
| 4,695,301 | 9/1987 | Okajima et al. | 210/510.1 |
| 4,719,479 | 1/1988 | Kyogoku | 210/510.1 |

FOREIGN PATENT DOCUMENTS

| | | | |
|---|---|---|---|
| 0191982 | 8/1986 | European Pat. Off. | 493/966 |
| 1124955 | 10/1956 | France | 493/966 |
| 189979 | 6/1964 | Sweden | 493/966 |

Primary Examiner—Richard V. Fisher
Assistant Examiner—Wanda L. Millard
Attorney, Agent, or Firm—Thomas J. Dodd

[57] ABSTRACT

A disc used primarily in extruding machines positioned between a fluid strainer and a forming die. The disc includes multiple adjacent walls which define honeycomb passages for the fluid to flow through. The disc may serve as a support for the strainer, or with modifications, may be used to achieve other functions, such as fluid mixing and flow rate enhancing.

11 Claims, 2 Drawing Sheets

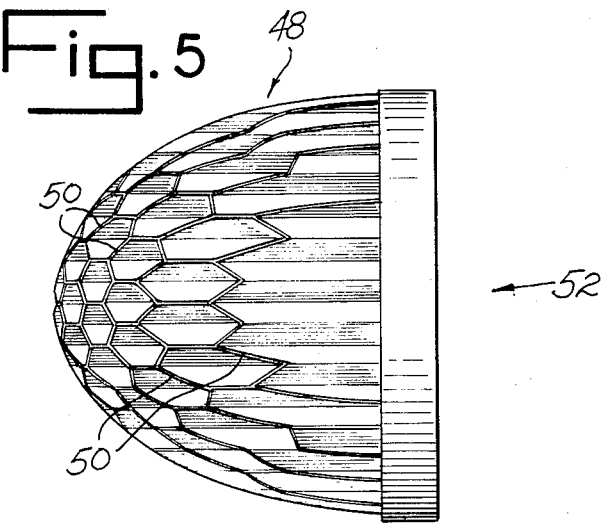
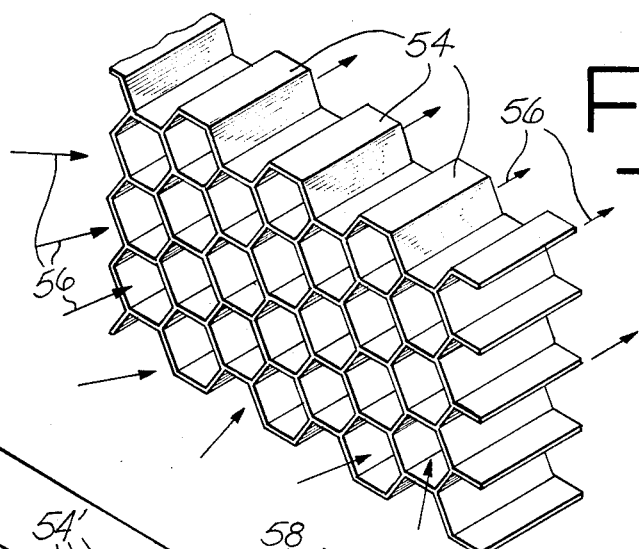
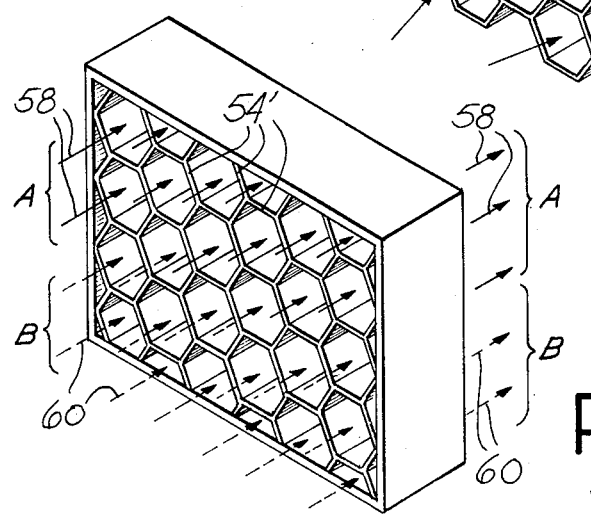

HONEYCOMBED FILTER SUPPORT DISC

SUMMARY OF THE INVENTION

This invention relates to a honeycombed disc and will have application to filter supports, mixers, and fluid flow balancers and separators in the extruded plastics art.

Plastic extruding machines generally operate by pushing molten polymer through a conduit and a die of the approximate shape of the parts to be extruded. The polymer often contains impurities which can diminish the value of the extruded parts and is therefore filtered prior to its being forced through the die and allowed to cure.

The honeycombed disc of this invention includes a plurality of honeycomb-shaped passages positioned along and in alignment with the fluid flow path. The disc is positioned between the filter and the die and may serve to support the filter against forces caused by flow restriction through the filter. The disc may also be modified to serve as a static flow mixer, a flow straightener and separator, or as a flow rate balancer or filter.

Accordingly, it is an object of this invention to provide for a honeycombed disc which supports a fluid filter in a plastic extruding machine.

Another object of this invention is to provide for a honeycombed disc which acts to statically mix the fluid contents in an extruding machine to produce a homogenous mixture.

Another object of this invention is to provide for a honeycombed disc with filters solid impurities from the fluid polymers in an extruding machine.

Other objects of this invention will become apparent upon a reading of the following description.

BRIEF DESCRIPTION OF THE DRAWINGS

FIG. 5 is an elevational view of a second modified honeycombed disc having variable length passages for balancing fluid flow rate.

FIG. 6 is a perspective view of the disc of FIGS. 1 and 2 showing its capacity as a fluid flow straightener.

FIG. 7 is a perspective view of the disc of FIG. 6 showing its ability to separate various different components of the fluid.

DESCRIPTION OF THE PREFERRED EMBODIMENTS

The preferred embodiments herein described are not intended to be exhaustive or to limit the invention to the precise forms disclosed. They are chosen and described to explain the principles of the invention and their application and practical use to enable others skilled in the art to utilize the invention.

Figure 1:
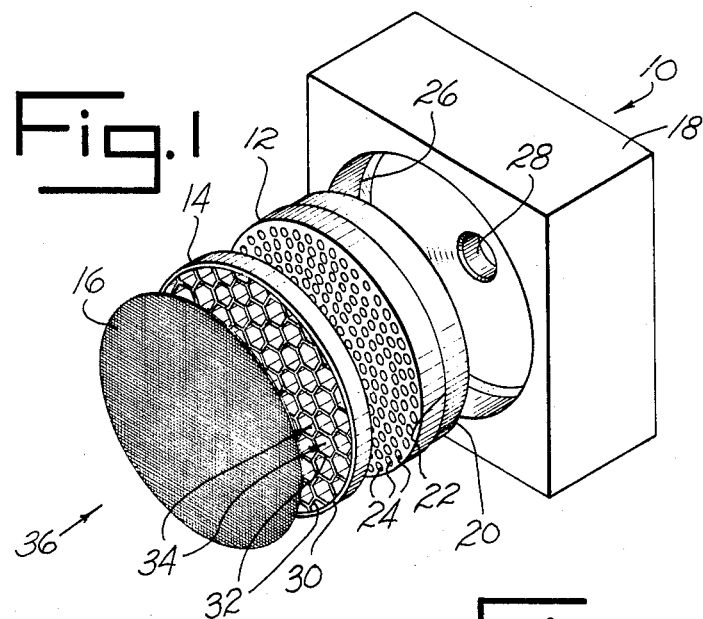
FIG. 1 is a fragmentary perspective view of the honeycombed disc shown in use in an extruding machine and used primarily as a support for the filter.
Figure 2:
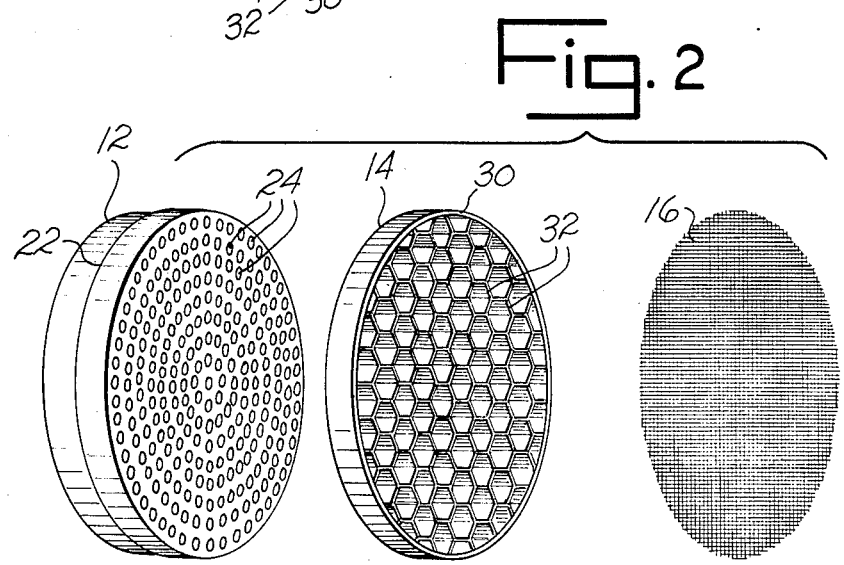
FIG. 2 is an exploded view of the breaker plate, disc and screen.

Referring now to FIGS. 1 and 2, reference numeral 10 generally designates the filter assembly of this invention as employed within a plastics extruding machine (not shown). Filter assembly 10 generally includes breaker plate 12, honeycomb disc 14, and strainer screen 16 fitted within extrusion die 18. Breaker plate 12 is a standard, commercially available item which consists of an annular plate 20 having a stepped side edge 22. Plate 20 defines a plurality of holes 24 which extend completely therethrough. Conventional breaker plates normally have about 30% of the plate surface interrupted by holes 24 as shown, and are fitted within a cavity 26 of extrusion die 18 adjacent the fluid outlet bore 28. Strainer screen 16 is also preferably a standard, commercially available wire mesh screen and is usually positioned adjacent to breaker plate 12.

Honeycomb disc 14 as shown in the drawing, preferably includes an annular retainer ring 30 and a plurality of honeycomb cells 32 which define multiple passages 34 through the disc. Disc 14 is preferably constructed to have about 90% of its surface area interrupted by passages 34. Preferably, disc 14 will be positioned between the screen 16 and breaker plate 12, and acts as a support against the flow forces acting on the screen.

In certain variations, breaker plate 12 may be eliminated, substituting other honeycomb discs of varying cell size, stiffness, and porosity. In operation, molten plastic (not shown) flows towards extrusion die 18 in the direction of arrow 36 within a flow conduit (not shown). As the plastic contacts strainer screen 16, impurities are filtered out and the plastic passed through disc 14 and breaker plate 12 to die 18, with the disc and breaker plate supporting the thin screen against the forces of the oncoming molten plastic.

Figure 3:
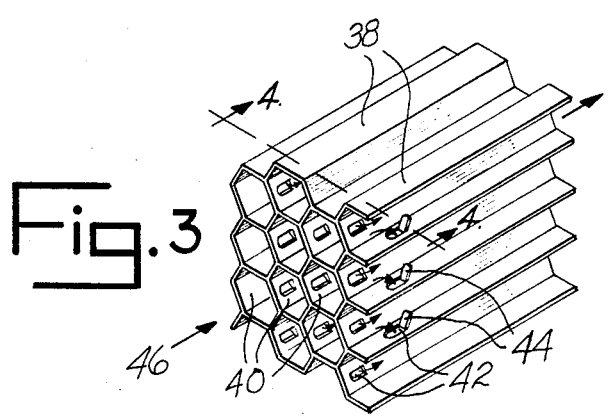
FIG. 3 is a perspective view of a modified honeycombed disc with holes interlinking the adjacent passages.
Figure 4:
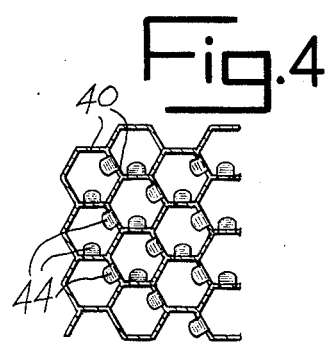
FIG. 4 is a cross-sectional view taken along line 4—4 of FIG. 3.

FIGS. 3 and 4 illustrate an alternative form of honeycomb cells 38. In this embodiment, the honeycomb cell walls 40 define openings 42 which allow the cells to be in fluid flow communication with each adjacent cell. Openings 42 may be formed by punching holes in cell walls 40 as shown in FIG. 3 to form tabs 44. As the molten plastic flows in the direction of arrow 46 into honeycomb cells 38, openings 42 provide for intercommunication between the individual cells to promote static mixing of the fluid, thus providing for a more homogenous fluid stream. Tabs 44 serve to deflect a portion of the stream through an adjacent opening 42 to promote mixing.

FIG. 5 illustrates a second alternative form of disc 48. Disc 48 has a plurality of honeycomb cells 50 with the cells being of varied lengths. In the embodiments shown, cells 50 nearer the central portion are longer in length than the cells located near the periphery of disc 48, with the cell lengths preferably tapering from the maximum central length down to their minimum length at the periphery. As molten plastic approaches disc 48 in the direction of arrow 52, the flow rate of the fluid stream tends to be greatest near the center, with the peripheral flow rate being less due to frictional forces between the fluid and the carrying conduit (not shown). By forming the cells 50 of varying lengths as shown, frictional forces between the stream and the cell walls tend to slow down the flow rate through the center of the disc to a greater degree so that a uniform flow rate is achieved throughout the cross-sectional area of the carrying conduit (not shown) when the fluid stream exits the disc 48. This fluid flow uniformity may also be achieved by varying the size of the passages through disc 48 to adjust the frictional forces acting on various portions of the fluid stream as it passes through the disc 48.

FIGS. 6 and 7 illustrate two more functions which may be performed by honeycomb cells 54 and 54'. In FIG. 6, cells 54 are shown straightening or aligning fluid flow through the cells with the fluid flow designated by arrows 56.

In FIG. 7, cells 54' are shown in action as a flow separator. Numeral 58 designates fluid flow of a first compound, while numeral 60 designates fluid flow of a second discreet compound flowing separately but along with the first compound. As flows 58 and 60 pass through cells 54', the cells serve to keep the flow separated and not intermix or diffuse. It should be noted that cells 54, 54' can perform the straightening or separation functions either as a stand alone unit or in combination with a filter assembly as described above. Cells 32, 38, and 54, 54' may also be employed as a stand alone filter by decrease the size of the individual cells.

It is understood that the above descriptions do not limit the invention to the precise forms disclosed but may be modified within the scope of the following claims.

I claim:

1. A fluid filter support assembly adapted for use in an extruding machine, said filter support assembly comprising a filter screen and a disc having multiple honeycomb-shaped cells formed therein, said disc positioned in a fluid flow path within a conduit downstream of said filter screen, said honeycomb cells defining passages through the disc aligned with said flow path and filter screen, said disc constituting means for supporting said filter screen against resistance to fluid flow through said conduit.

2. The fluid filter assembly of claim 1 wherein said honeycomb cells define multiple adjacent wall parts, each cell communicating with adjacent cells through an opening defined in each wall part whereby static intermixing of fluid is achieved.

3. The fluid filter of claim 2 wherein said wall parts include a tab adjacent each opening, said tabs constituting means for diverting a percentage of said fluid through said opening to said adjacent cell.

4. The fluid filter of claim 1 wherein said cells are of varying lengths throughout a cross-sectional area of the disc.

5. The fluid filter of claim 4 wherein said cells are longer adjacent a center of said disc, said cells becoming gradually shorter towards a periphery of said disc wherein unequal flow rates are balanced as fluid passes through said cells.

6. A fluid filter support assembly adapted for use in an extruding machine, said filter support assembly comprising a filter screen, a disc having multiple honeycomb-shaped cells therein, and a breaker plate having holes therethrough said disc positioned in a fluid flow path within a conduit downstream from and adjacent said filter screen and upstream of said breaker plate, said disc including passages defined by said cells aligned with said flow path, said disc constituting means for supporting said filter screen against resistance to fluid flow through said conduit and for passing fluid to said breaker plate.

7. The fluid filter of claim 5 wherein said honeycomb cells define multiple adjacent wall parts, each cell communicating with adjacent cells through an opening defined in each wall part whereby static intermixing of fluid is achieved.

8. The fluid filter of claim 7 wherein said wall parts include a tab adjacent each opening, said tabs constituting means for diverting a percentage of said fluid through said opening to said adjacent cell.

9. The fluid filter of claim 6 wherein said cells are of varying lengths throughout a cross-sectional area of the disc.

10. The fluid filter of claim 9 wherein said cells are longer adjacent a center of said disc, said cells becoming gradually shorter towards a periphery of said disc wherein unequal flow rates are balanced as fluid passes through said cells.

11. The fluid filter of claim 6 wherein said passages are of varying sizes throughout a cross-sectional area of the disc.

* * * * *